A. A. SCOTT.
CYCLE SIDE CAR.
APPLICATION FILED AUG. 27, 1915.
1,236,988.
Patented Aug. 14, 1917.
2 SHEETS—SHEET 1.
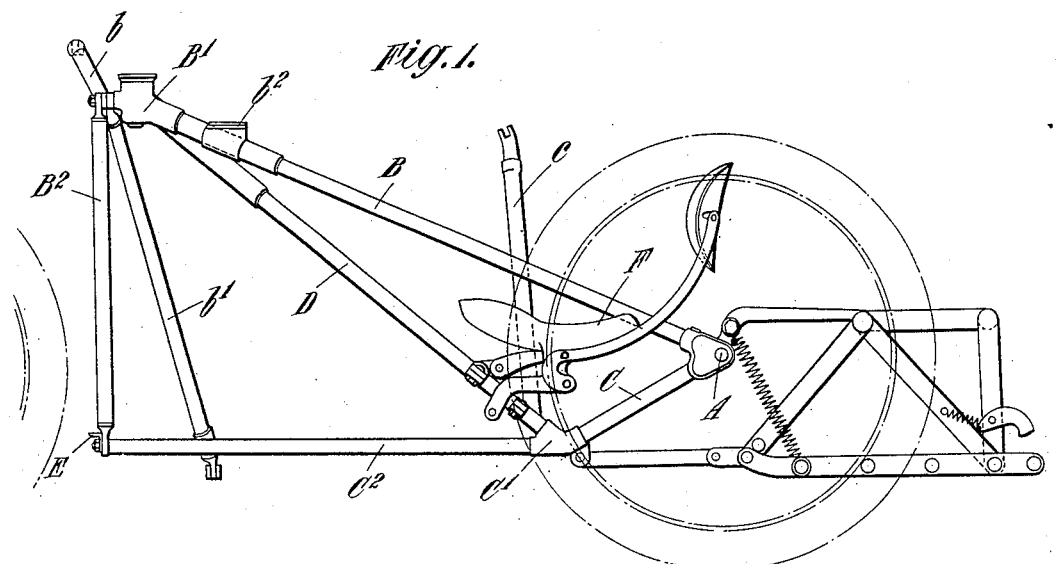
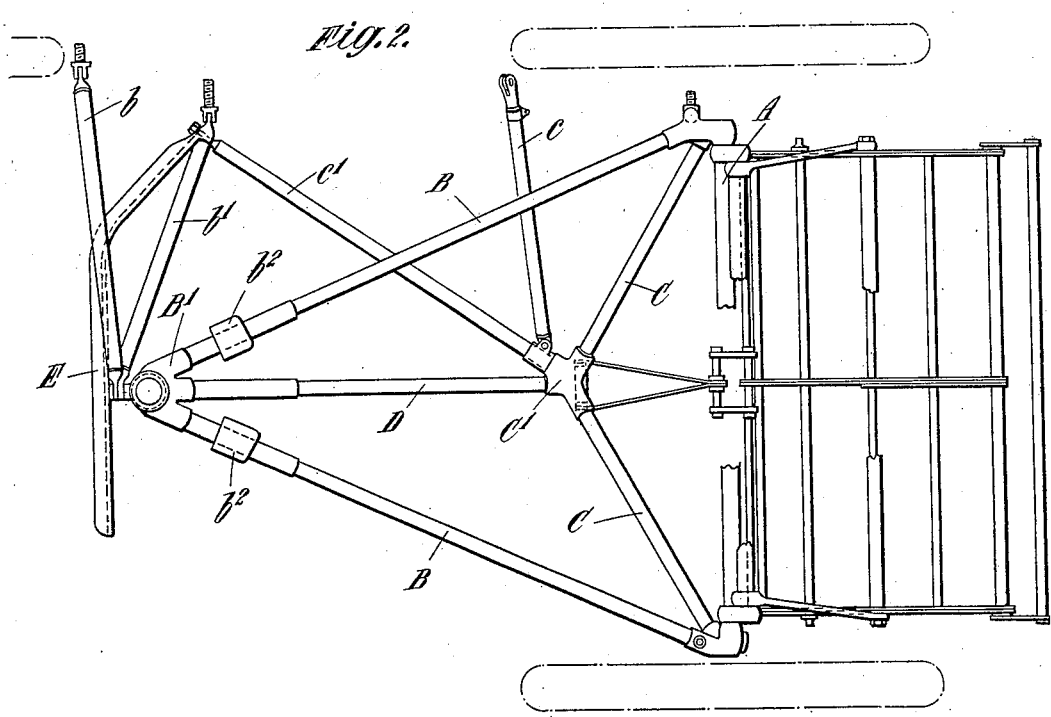
Inventor
Alfred Angas Scott
By
Attys.

A. A. SCOTT.
CYCLE SIDE CAR.
APPLICATION FILED AUG. 27, 1915.

1,236,988.

Patented Aug. 14, 1917.
2 SHEETS—SHEET 2.

Inventor:
Alfred Angas Scott
By
Attys.

UNITED STATES PATENT OFFICE.

ALFRED ANGAS SCOTT, OF SHIPLEY, ENGLAND, ASSIGNOR OF ONE-HALF TO VICKERS LIMITED, OF WESTMINSTER, ENGLAND.

CYCLE SIDE CAR.

1,236,988.  Specification of Letters Patent.  Patented Aug. 14, 1917.

Application filed August 27, 1915. Serial No. 47,703.

*To all whom it may concern:*

Be it known that I, ALFRED ANGAS SCOTT, a subject of the King of Great Britain, residing at Hirst Lane, Saltaire, Shipley, in the county of York, England, have invented certain new and useful Improvements in Cycle Side Cars, of which the following is a specification.

The present invention relates to a side car for a motor propelled vehicle, serving to carry a machine gun.

According to the invention the framework of the side car comprises a number of interconnected triangulated structures of which one is upwardly and forwardly inclined and has its base constituted by the axle member and its apex by a junction piece (herein referred to as the head or forward junction piece) which is adapted to receive and support the gun and is arranged at a convenient height relative to the handle bars and other parts of the machine to enable the gun to be conveniently operated. The axle member also forms the base of a downwardly inclined triangulated structure, the apex of which is constituted by a junction piece which will be referred to as the lower junction piece. The head or forward junction piece and the lower junction piece are connected by a straight inclined member. Attachment members are arranged from the forward junction piece to the steering head of the motor cycle, from the forward junction piece down to the engine bracket, from the lower junction piece to the seat pillar and from the lower junction piece to the engine bracket.

In order that the said invention may be clearly understood and readily carried into effect, we will describe the same more fully with reference to the accompanying drawings, in which:—

Figures 1, 2 and 3 are respectively a side elevation, a plan and a rear elevation showing more or less diagrammatically a constructional form of the framework of the improved side car.

Fig. 1 shows the location of the seat or saddle for the gunner, which has been omitted from Figs. 2 and 3.

Figure 3:
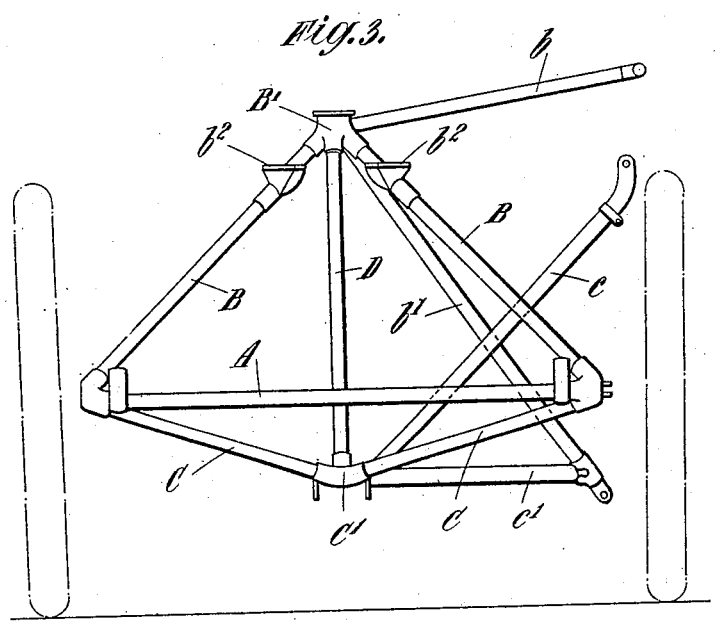

A is the aforesaid axle member or base of the two triangulated structures. B, B represent the side members of the triangulated structure whose junction piece B' (the forward junction piece or head) serves as a support or socket for the training pivot of a gun. C, C represent the side members of the other triangulated structure and C' represents the junction piece (the lower junction piece) of these side members. D represents the straight inclined member connecting the two junction pieces together, $b$ $b'$, $c$, $c'$ represent the attachment members connecting respectively the forward junction piece B' to the steering head of the cycle, the said junction piece to the engine bracket, the lower junction piece C' to the seat pillar and the latter junction piece to the engine bracket.

In the example shown the forward junction piece B' has connected to it a vertical member $B^2$ which is connected at its lower end to a member $C^2$ projecting horizontally from the lower junction piece. At the junction of these two pieces there is arranged a cross piece E which is free at its outer end and is preferably secured at its inner end to the junction of the two attachment members $b'$, $c'$ connected to the engine bracket. This cross piece serves as a foot rest for the gunner who is accommodated on a seat or saddle F which is mounted above the lower junction piece C' as illustrated at Fig. 1. Suitably mounted on the members B, B are plates $b^2$, $b^2$ upon which the upper carriage of the gun rests.

The side car is shown as having an ammunition carrier which however does not form part of the present invention.

What I claim and desire to secure by Letters Patent of the United States is:—

1. A cycle side car having a framework comprising interconnected triangulated structures one of which is upwardly and forwardly inclined and has its base constituted by the axle member of the side car and its apex constituted by a junction piece to serve as a support for a gun.

2. A cycle side car having a framework comprising interconnected triangulated structures one of which is upwardly and forwardly inclined and has its base constituted by the axle member of the side car and its apex constituted by a junction piece to serve as a support for a gun, in combination with a seat for the gunner.

3. A cycle side car having a framework comprising interconnected triangulated structures one of which is upwardly and forwardly inclined and has its base constituted by the axle member of the side car and its apex constituted by a junction to serve as a support for a gun, in combination with a seat for the gunner, and a member serving as a foot rest for the gunner.

4. A cycle side car having a framework comprising interconnected triangulated structures one of which is upwardly and forwardly inclined and has its base constituted by the axle member of the side car and its apex constituted by a junction piece to serve as a support for a gun, in combination with a seat for the gunner, a member serving as a foot rest for the gunner and means for attaching the side car to a cycle.

5. A cycle side car having a framework comprising two triangulated structures one of which is inclined upwardly and the other downwardly from a common base, and a straight inclined member connecting the apex of the first mentioned structure to the apex of the other structure.

6. A cycle side car having a framework comprising two triangulated structures one of which is inclined upwardly and the other downwardly from a common base, a straight inclined member which connects the apex of the first mentioned structure to the apex of the other structure, a junction piece at the apex of said first mentioned structure serving as a support for a gun, a junction piece at the apex of the other structure, and a seat for a gunner located above said last mentioned junction piece.

7. A cycle side car framework comprising two triangulated structures one of which is inclined upwardly and the other downwardly from a common base, a straight inclined member connecting together the apexes of said structures, a forward junction piece at the apex of said first mentioned structure serving as a support for a gun, a lower junction piece at the apex of the other structure, a seat for a gunner located above said lower junction piece, means carried by said framework for attaching it to a cycle, a vertical member connected at its upper end to said forward junction piece, a member projecting horizontally from the lower junction piece, said member being connected to the lower end of said vertical member and a cross piece at the junction of said two last mentioned members serving as a foot rest for a gunner.

In testimony whereof, I hereto affix my signature.

ALFRED ANGAS SCOTT.

Copies of this patent may be obtained for five cents each, by addressing the "Commissioner of Patents, Washington, D. C."

It is hereby certified that in Letters Patent No. 1,236,988 granted August 14, 1917, upon the application of Alfred Angas Scott, of Shipley, England, for an improvement in "Cycle Side Cars," an error appears in the printed specification requiring correction as follows: Page 2, line 2, claim 3, after the word "junction" insert the word *piece;* and that the said Letters Patent should be read with this correction therein that the same may conform to the record of the case in the Patent Office.

Signed and sealed this 20th day of November, A. D., 1917.

[SEAL.]                                                  R. F. WHITEHEAD,

*Acting Commissioner of Patents.*

Cl. 208—45.